US008428111B2

(12) United States Patent  (10) Patent No.: US 8,428,111 B2
Valliappan et al.  (45) Date of Patent: Apr. 23, 2013

(54) CROSSTALK EMISSION MANAGEMENT

(75) Inventors: Magesh Valliappan, Austin, TX (US); Howard Baumer, Laguna Hills, CA (US); Anthony Brewster, Laguna Niguel, CA (US); Vivek Telang, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 1357 days.

(21) Appl. No.: 11/799,368

(22) Filed: May 1, 2007

(65) Prior Publication Data

US 2007/0274379 A1  Nov. 29, 2007

Related U.S. Application Data

(60) Provisional application No. 60/802,868, filed on May 23, 2006.

(51) Int. Cl.
*H03H 7/30* (2006.01)
*H03K 5/159* (2006.01)

(52) U.S. Cl.
USPC ............ 375/232; 375/231; 375/233; 375/234

(58) Field of Classification Search .................. 375/229, 375/231, 232, 233, 236
See application file for complete search history.

(56) References Cited

U.S. PATENT DOCUMENTS

| 2002/0141495 | A1* | 10/2002 | Hatamian | 375/229 |
| 2003/0086515 | A1* | 5/2003 | Trans et al. | 375/346 |
| 2003/0127609 | A1* | 7/2003 | El-Hage et al. | 250/574 |
| 2003/0156603 | A1* | 8/2003 | Rakib et al. | 370/485 |
| 2004/0028159 | A1* | 2/2004 | Abdelilah et al. | 375/350 |
| 2008/0260066 | A1* | 10/2008 | Cai et al. | 375/297 |

OTHER PUBLICATIONS

"IEEE Draft P 802.3ap TM/Draft 3.2", *IEEE Standards Activities Department*, Dec. 4, 2006, 1-199.
Altera Corporation, "Using Pre-Emphasis and Equalization With Stratix GX", (Sep. 2003), 11 pgs.
Bereza, William , et al., "PELE: Pre-emphasis & Equalization Link Estimator to Address the Effects of Signal Integrity Limitations", *DAC* Jul. 24-28, 2006, 1013-1016.
Ren, Jihong , et al., "Crosstalk Cancellation for Realistic PCB Buses", Aug. 24, 2004, 10 pages.

* cited by examiner

*Primary Examiner* — Daniel Washburn
*Assistant Examiner* — Qutbuddin Ghulamali
(74) *Attorney, Agent, or Firm* — Brake Hughes Bellermann LLP

(57) ABSTRACT

Various embodiments are disclosed relating to crosstalk emission management. In an example embodiment, an amplitude of a main tap of a transmit equalizer may be determined to limit crosstalk emitted from a local channel to one or more other channels to be less than a threshold. A ratio of an amplitude of at least one secondary tap of the transmit equalizer to the amplitude of the main tap may be determined to provide equalization to the local channel.

18 Claims, 5 Drawing Sheets

CROSSTALK EMISSION MANAGEMENT

CROSS-REFERENCE TO RELATED APPLICATION

This application claims priority based on U.S. Provisional Application No. 60/802,868, filed on May 23, 2006, entitled, "METHOD TO LIMIT TXFIR AND TX AMPLITUDE TO MANAGE CROSSTALK," the disclosure of which is hereby incorporated by reference.

TECHNICAL FIELD

This description relates to crosstalk emission management.

BACKGROUND

With the growth and expansion of information technology, communication not only between two more nodes across a network, but also between two or more nodes in single device, and even between two or more nodes on a single chip, circuit or backplane has become ever more important. For example, it is common to provide high-speed communication between devices across a backplane, or chip to chip communications. The backplane may often provide a number of traces or conductors for providing communication paths between different devices or ports.

However, as transmission frequencies continue to increase, frequency dependent transmission losses become a more significant problem for device level communications. This transmission loss can cause greater attenuation of high frequency component of the signals, which may make it difficult for a receiver to correctly interpret or detect the received bits or signals. This may increase the bit error rate.

In addition, cross talk, or electro-magnetic transmissions, from adjacent or nearby channels or communication paths may create interference with transmitted signals. For example, longer transmissions may result in more attenuated (i.e. elongated and weaker) signals being received at a receiving node where energy emissions from adjacent transmissions may also be received. A closer proximity of a channel or receiver to an adjacent transmitter and/or transmission medium may result in a larger volume of adjacent energy emissions, or crosstalk, being received by the receiver. The combination of attenuated signals from longer transmissions and relatively strong energy emissions or crosstalk from adjacent transmissions may result in the receiver having greater difficulty in correctly detecting transmitted signals, and distinguishing transmitted signals from the crosstalk or adjacent interference.

To partially compensate for the attenuation, pre-emphasis or other equalization techniques have been applied to transmitted signals. Unfortunately, many approaches are either typically ad-hoc in nature, or, for example, attempt to solve attenuation, without regard to crosstalk. It may be desirable to address both signal attenuation and crosstalk.

SUMMARY

According to an example embodiment, an method is provided including determining an amplitude of a main tap of a transmit equalizer to limit crosstalk emitted from a local channel to one or more other channels to be less than a threshold. A ratio of an amplitude of at least one secondary tap of the transmit equalizer to the amplitude of the main tap to provide equalization to the local channel may be determined.

According to another example embodiment, an apparatus is provided including a transmit equalizer having a main tap associated with a main pulse output from the equalizer and at least one secondary tap associated with at least one secondary pulse output from the equalizer; wherein an amplitude of the main tap of the transmit equalizer is configured to limit crosstalk emitted from a local channel to one or more other channels to be a fixed value or to be less than a threshold; and a ratio of an amplitude of the at least one secondary tap of the transmit equalizer to the amplitude of the main tap is configured to provide equalization to the local channel.

According to another example embodiment, a system is provided including a transmitter including a transmit equalizer configured to determine a ratio of a main tap to one or more secondary taps to provide equalization to a local channel, the main tap and the one or more secondary taps each of which being associated with a pulse of a signal output by the transmitter; wherein an amplitude of a main pulse associated with the main tap is less than or equal to a maximum main tap amplitude configured to limit crosstalk emitted from the local channel to one or more other channels to be less than a threshold; and wherein a sum of absolute values of amplitudes of the main tap and the at least one secondary tap is less than or equal to a maximum amplitude range. The system may include a receiver configured to receive the signal output by the transmitter via the local channel.

The details of one or more implementations are set forth in the accompanying drawings and the description below. Other features will be apparent from the description and drawings, and from the claims.

DETAILED DESCRIPTION

Figure 1:
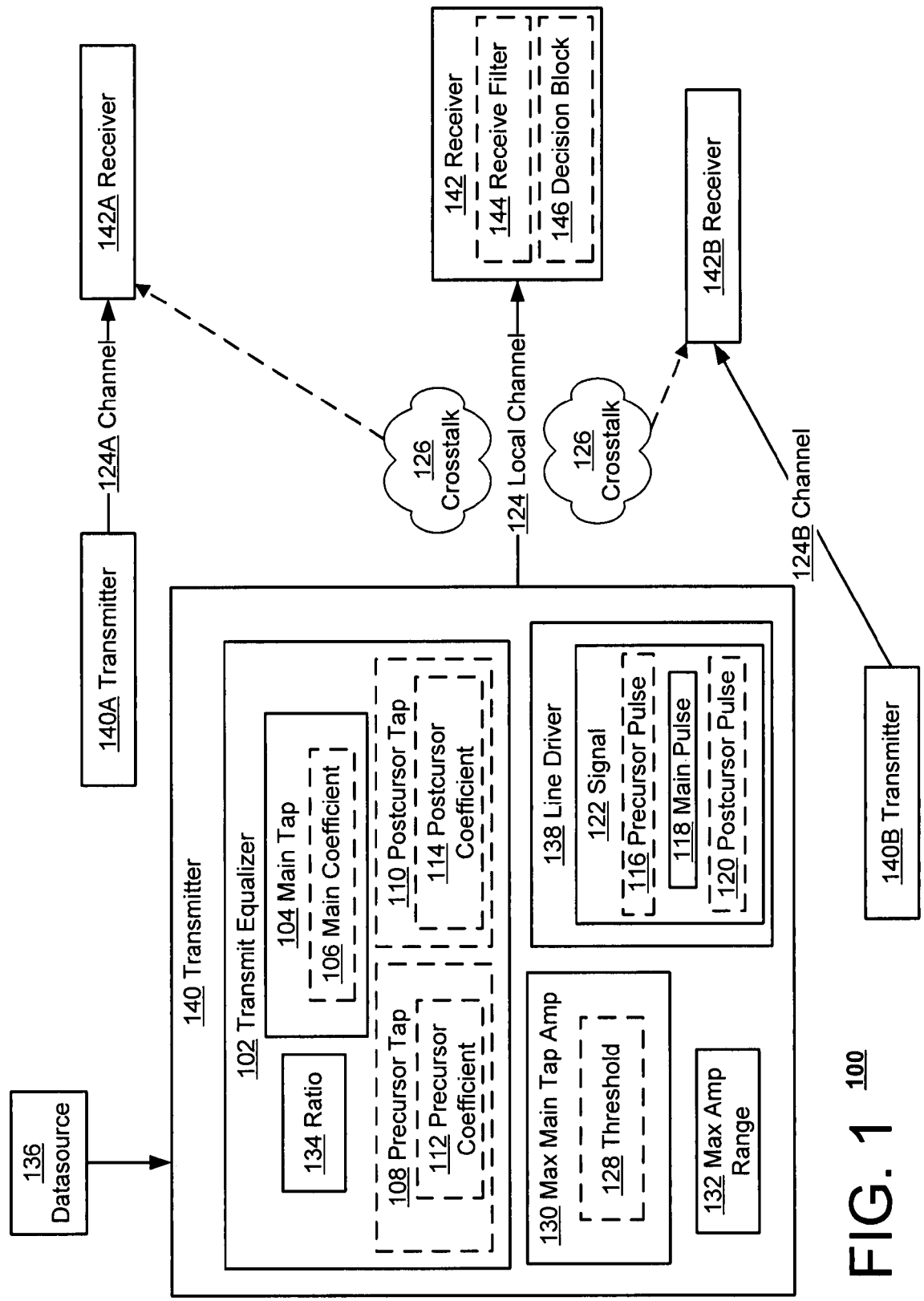
FIG. 1 is a block diagram of an example system 100 for managing crosstalk emissions.

FIG. 1 is a block diagram of an example system 100 for managing crosstalk emissions. In the example of FIG. 1, a system 100 may include a transmit equalizer 102, which may include a FIR (finite impulse response) filter. The FIR filter of the transmit equalizer 102 may include one or more taps, such as a main tap 104 and one or more secondary taps, for example, a precursor tap 108 and a post cursor tap 110. Each tap may include a tap weight or coefficient by which it adjusts an incoming signal or bit stream. For example, main tap 104 may include a main coefficient 106, precursor tap 108 may include precursor coefficient 112, and postcursor tap 110 may include postcursor coefficient 114. According to an example embodiment, an amplitude or main coefficient 106 of main tap 104 of transmit equalizer 102 may be adjusted to limit crosstalk emitted from a local channel to one or more other (e.g., adjacent or nearby) channels. The main coefficient 106 of main tap 104 may, for example, have a greater absolute value than the coefficients of the secondary taps.

In an example embodiment, the value of main coefficient 106 may have the strongest or most direct impact on the crosstalk (e.g., 126) emitted to nearby channels. While the secondary coefficients (e.g., 112, 114) may impact crosstalk, the value of main coefficient 106 may, at least in some cases, provide a more significant or more dominant influence on crosstalk, as compared to the typically smaller secondary coefficients. Thus, by adjusting or limiting the amplitude or value of main coefficient 106, crosstalk may be limited or decreased (e.g., limited to less than a value or threshold (e.g., 128)). Thus, in an example embodiment, main coefficient 106 of the transmit equalizer 102 may first be set to a value that may decrease or limit crosstalk, e.g., so that crosstalk is less than a threshold. Then for example, an incoming signal or bit stream may be equalized without changing or increasing main coefficient 106 beyond a maximum value.

Equalization of the local channel (e.g., 124) or transmission medium may be performed, for example, by determining a ratio (e.g., 134) of an amplitude or value of at least one of the secondary tap coefficients (e.g., secondary coefficients 112 and/or 114) to the amplitude of the main tap coefficient 106. Thus, after setting the value of main coefficient 106 to limit or decrease crosstalk emitted to nearby (or other) channels, the ratio of the secondary tap coefficient(s) 112 and/or 114 to main tap coefficient 106 may be set to provide the desired equalization or pre-emphasis for the transmitted signal, for example. In this manner, the crosstalk emitted from the local channel to other channels may be limited, and equalization may be applied to the local channel (e.g., via pre-emphasis). Further details relating to various embodiments will now be explained.

Referring to FIG. 1 again, system 100 may include a transmit equalizer 102. Transmit equalizer 102 may include a filter to perform signal processing, such as a FIR filter to process a received signal or data stream. For example, transmit equalizer 102 may include filter (tap) weights or coefficients that may be multiplied by received bits or signals, or multiplied by delayed versions of received signals or bits, and then added or summed together, in order to process the received bits (or bit stream) or signals. Main coefficient 106 and secondary coefficients 112, 114 may be any value, positive or negative. In an example embodiment, the coefficients 106, 112 and 114 may be values between −1 and 1. For example, main coefficient may be a positive number between zero and 1, and secondary coefficients 112 and 114 may be negative values between 0 and −1.

As noted, transmit equalizer 102 may include a main tap 104. Main tap 104 may multiply an incoming data stream or signal by main coefficient 106. For example, transmit equalizer 102 may receive one or more sequences of bits, whereby main tap 104 may multiply or otherwise adjust at least a portion (or delayed portion) of the sequences by main coefficient 106. Main coefficient 106 may include a constant, variable or other value used to perform one or mathematical functions or mathematical processing on a data stream.

Transmit equalizer 102 may also, in addition to main tap 104, include one or more secondary taps. Although two secondary taps are shown, any number may be used. For example, transmit equalizer 102 may include a precursor tap 108 and/or a postcursor tap 110. The secondary taps (e.g., 108 and 110) may be similar or substantially similar to main tap 104. For example, the secondary taps may perform data processing on an incoming data stream or bit sequence, or a delayed portion thereof. However in relation to main tap 104, precursor tap 108 may perform a multiplication function or otherwise adjust a portion of the data stream prior to main tap 104. For example, at least a first portion (e.g., first bit) of a data stream may be adjusted by precursor tap 108 and at least a second, delayed portion may be adjusted by main tap 104. Conversely, postcursor tap 110 may perform a mathematical function such as multiplication on a delayed portion of a data stream after main tap 104. In other example embodiments, transmit equalizer 102 may include more, less and/or different secondary taps.

A precursor coefficient 112 and a postcursor coefficient 114 may, similar to main coefficient 106, include constants, variables or other values used to process at least a portion of a data stream by precursor tap 108 and postcursor tap 110, respectively. For example, each of the received bits, or a delayed version of the bits, may be multiplied by the coefficients 106, 112 and 114 and may then added or summed together.

According to an example embodiment, precursor tap 108 may multiply a received signal or bit by the precursor coefficient 112 to generate or otherwise produce a precursor pulse 116. A delayed version of the same bit or signal may then be multiplied by the main coefficient 106 of main tap 104 to generate a main pulse 118. A twice delayed version of the received bit or signal may be multiplied by the postcursor coefficient 114 of postcursor tap 110 to generate a postcursor pulse 120. This process may be repeated for each received bit on a bit stream or data stream. For example, by providing the negative precursor pulse 116 before the main pulse 120 and a negative postcursor pulse 110 after the main pulse 18, these pulses 116 and 120 may provide some equalization or compensation for the signal attenuation on the local channel by emphasizing the rising edge and falling edge of the received bit (the main pulse 118), for example. Such equalization or signal emphasis provided at a transmitter for the local channel may make it easier on a receiver to correctly detect the received bit, for example.

As discussed above, main tap 104 may multiply one or more incoming bits, or delayed versions thereof, by main coefficient 106, resulting in an adjusted bit (or bit stream) which may correspond to main pulse 118. Then for example, precursor pulse 116 and postcursor pulse 118 may include secondary pulses configured to adjust for potential attenuation so that upon receipt, main pulse 118 may be more easily determined to represent the corresponding bit.

A pulse (e.g. 116, 118, 120) may include a change in one or more characteristics of a data stream or signal from a baseline value, followed by a return to the baseline value. For example, main pulse 118 may include a variation of a data stream as determined by main tap 104 multiplying main coefficient 106 by at least a delayed portion of the data stream. Similarly, precursor pulse 116 and postcursor pulse 118 may include a variation of the data stream as determined by precursor tap 108 and postcursor tap 110 multiplying at least a portion of the data stream, before and after main tap 104, respectively, by precursor coefficient 112 and postcursor coefficient 114. The pulses (e.g., 116, 118, 120) may each be associated with an amplitude as discussed below.

A signal 122 may include a bit (or bit stream), data stream, or other data transmittable between two or more nodes via a transmission medium, such as a channel. For example, signal 122 may include one or more packets or bits transmittable between two or more nodes. Signal 122 may include a data stream or bit stream as adjusted/equalized by transmit equalizer 102. For example, signal 122 may include a filtered signal as adjusted by transmit equalizer 102, including precursor pulse 116, main pulse 118 and/or postcursor pulse 120. In other example embodiments, signal 122 may include additional and/or different pulses corresponding to additional and/or different taps of the FIR filter or transmit equalizer 102.

Signal 122 may be transmittable via local channel 124. Local channel 124 may include a communications or transmission medium, such as a conductor, a trace, or other channel, used to transmit messages, including signals (e.g. 122) between two or more nodes. For example local channel 124 may transmit signal 122 between a first and second node on a circuit or on a backplane, both of which may be coupled to local channel 124. According to an example embodiment local channel 124 may include a limited bandwidth channel that may attenuate signal 122 during transmission, whereby during transmission, signal 122 may become distorted due to channel dispersion.

In addition, during transmission of signal 122, local channel 124 may emit energy (e.g. crosstalk 126) that may be received at other channels as noise or interference. Crosstalk 126 may include energy, such as electromagnetic energy, emitted from local channel 112 during a transmission of signal 122 between two or more nodes. For example, crosstalk 126 may originate from varying the current during the transmission of signal 122. Crosstalk 126 may include capacitive, inductive or conductive coupling from one circuit to another, part of a circuit or from one channel to another. For example, local channel 124 may transmit signal 122 from a first node to a second node on a circuit or baseband and emit crosstalk 126 which may be received by a third, adjacent node (e.g. 142A and/or 142B) or channel (e.g. 124A and/or 124B). The third node may then for example receive a signal from transmitter 140B via channel 124B, and may also receive crosstalk 126 that may have been unintentionally received from channel 124 (and/or transmitter 140), where the crosstalk 126 may interfere with the third node's signal processing or detection of bits or signals.

To prevent or limit crosstalk 126 from interfering with signal processing by adjacent nodes, a threshold 128 may be determined. Threshold 128 may include a maximum acceptable or allowable crosstalk 126 to be emitted by one or more channels (e.g. local channel 124) during transmission of signals (e.g. 122) and/or a maximum acceptable crosstalk 126 that may be received by one or more adjacent nodes (or channels).

According to an example embodiment, crosstalk 126 as emitted by local channel 124 may correlate, at least in part, with the amplitude of main tap 104 (which may correlate with the amplitude of main pulse 118) and be determined, based at least in part, on main coefficient 106. For example as the value of main coefficient 106 increases, so too may typically increase the amplitude of main pulse 118 and the amount or volume of crosstalk 126 emitted from local channel 124 during transmission of signal 122. Then for example, by limiting or reducing the amplitude of main tap 104 (e.g. the amplitude of main pulse 118) and/or the value of main coefficient 106, this may correspondingly decrease or limit the crosstalk 126 emitted by local channel 124.

The amplitude of main tap 104 may be determined, for example, by determining the amplitude of main pulse 118 and/or determining the result of main coefficient 106 multiplied by a received bit or signal (or delayed version thereof), as discussed above. Then for example, crosstalk 126 emitted by local channel 124 during transmission of signal 122 may be limited or reduced below threshold 128 by setting the amplitude of main tap 104 at or below a maximum main tap amplitude (i.e., based on max main tap amp 130).

Max main tap amp 130 may include a maximum value for the amplitude of main tap 104. Max main tap amp 130 may be configured to limit crosstalk 126 to be at or below threshold 128. For example, based on threshold 128, max main tap amp 130 may be set to 5 volts whereby it may anticipated that if the amplitude of main tap 104 is set less than or equal to max main tap amp 130, then the amount of crosstalk (e.g., 126) or other energy emitted may be less than or equal to threshold 128. Then for example, main tap 104 may be constrained by a maximum amplitude of 5 volts (i.e. max main tap amp 130), which may cause the potential values of main coefficient 106 to be adjusted to ensure that the amplitude of main tap 104 (e.g. the amplitude of main pulse 118) remains at or below 5 volts. According to another example embodiment, max main tap amp 130 may include a maximum value by which to set main coefficient 106. For example, max main tap amp 130 may be set to 0.86, then for example, main tap 104 may only adjust main coefficient 106 such that its value remains at or below 0.86.

A max amp range 132 may include a maximum amplitude range for main tap 104 and the one or more secondary taps (e.g. 108, 110) of a FIR filter or transmit equalizer 102. For example, max amp range 132 may include a total maximum amplitude for an absolute sum of the amplitudes of main tap 104 with precursor tap 108 and postcursor tap 110, which may correspond to an absolute sum of the amplitudes of main pulse 118, precursor pulse 116 and postcursor pulse 120, respectively. For example, max amp range 132 may be 20 volts. Then for example, transmit equalizer 102 may distribute up to 20 volts of amplitude across the amplitudes of main tap 104, precursor tap 108 and postcursor tap 110 as necessary to equalize signal 122 for transmission via local channel 124. Max amp range 132 may include a maximum total amplitude for signal 122, whereby not all of the amplitude may need to be allocated among the taps (e.g., 104, 108, 110). For example, with max amp range set to 20 volts, it may be that only 18 volts are allocated among the three taps.

Max amp range 132 may be determined, at least in part, based on hardware constraints such as silicon conductivity and/or industry standards. For example, transmit equalizer 102 may be part of a circuit to be used in an electronics device, wherein industry standards may recommend a maximum voltage (i.e. 12 millivolts) for circuits to be used in the electronic device. Then for example, max amp range 132 may be set to 12 millivolts, or less.

According to another example embodiment, rather than being expressed as an absolute value, max main tap amp 130 may be expressed as a maximum percentage of max amp range 132 that may be allocated to main tap 104. For example, max amp range 132 may be determined to be 10 millivolts, then for example, max main tap amp 130 may be set to 75% (i.e. 7.5 millivolts).

Based at least in part on the constraints of max main tap amp 130 and max amp range 132, transmit equalizer 102 may determine ratio 134. As discussed above, transmit equalizer 102 may equalize local channel 124 or signals/bit streams for transmission thereon. The equalization of local channel 124 may include for example, adjusting an incoming data stream or bit stream and producing signal 122 including pulses 116, 118 and 120. As discussed above, equalization may include determining ratio 134, which may include a ratio of the taps (e.g., 104, 108, 110) of transmit equalizer 102 to one another. For example, ratio 134 may include a ratio of the amplitudes of main tap 104, precursor tap 108 and postcursor tap 110. Or for example, ratio 134 may include a ratio of main coefficient 106 to precursor coefficient 112 and postcursor coefficient 114.

Transmit equalizer 102 may determine ratio 134 (for the transmission of signal 122 via local channel 124) based at least in part on characteristics of local channel 124, including the length of local channel 124. For example, local channel 124 may include a limited bandwidth channel whereby during transmission signal 122 may become attenuated. Attenuation may include a reduction in the amplitude and/or intensity of a signal coupled with an elongation of one or more of the pulses. For example, signal 122 may include at transmission time, main pulse 118 of 1 time unit in duration and an amplitude of 5 volts. Then for example, upon receipt at a destination node, signal 122 may include, as a result of attenuation, main pulse with a duration of 1.6 time units and an amplitude of 3.75 volts. Thus main pulse 118 may have lost amplitude and/or become more spread out (i.e. increased duration) as a result of transmission attenuation. Thus ratio 134 may be determined to account and/or adjust for this potential attenuation of signal 122 during transmission via local channel 124. Longer channels may result in greater attenuation.

As discussed above, equalization may be provided to account for the signal attenuation and as such, ratio 134 may be determined and/or applied by transmit equalizer 102 to an incoming data stream or bit stream from datasource 136 to account and/or compensate for the potential attenuation of main pulse 118 during transmission via local channel 124. Datasource 136 may include a database, storage or other memory including data or signals to be transmitted. For example, datasource 136 may include a physical coding sub layer (PCS) that provides a bit stream, such as a whole number stream to transmit equalizer 102. The bit stream may include for example a sequence or sequences of 1s and −1s.

The bit stream from datasource 136 may then be equalized by transmit equalizer 102 under the constraints provided by max main tap amp 130 and max amp range 132, as discussed above. Upon applying the equalization or ratio 134 via main tap 104 and the one or more secondary taps (108, 110), transmit equalizer 102 may provide an adjusted or equalized bit stream, which may include a real number of floating point number bit stream to a line driver 138.

Line driver 138 may include a device, such as an amplifier, configured to provide voltage to an incoming data stream to produce a signal (e.g. 122). For example, line driver 138 may receive a floating point number bit stream or other equalized data stream from transmit equalizer 102. Then for example, line driver 138 may apply voltage to the bit stream to produce signal 122, including the pulses 118, 116 and 120 corresponding to the taps 104, 108 and 110. According to an example embodiment, each bit of the bit stream may correspond to a certain amount of voltage that may be applied by line driver 138. Then for example, by applying the corresponding voltage to the bits, the line driver may produce signal 122 including the pulses (e.g., 116, 118, 120) from an equalized bit stream as received from transmit equalizer 102. According to another example embodiment, the voltage, as applied by line driver 138 may be constrained by max amp range 132. Line driver 138 may then provide signal 122 to local channel 124 to be transmit from transmitter 140 to receiver 142.

Transmitter 140 may include a device configured to provide a message, packet, pulses or other signal (e.g. 122) to local channel 124 to be transmit to one or more other devices or nodes. For example, transmitter 140 may receive a data stream from datasource 136, prepare the data stream for transmission via local channel 124 (as discussed above) resulting in signal 122 to be transmit. According to an example embodiment, transmitter 138 may include a transmitter on a circuit or baseband, such as a PHY or transceiver or SERDES (serialize-deserializer), whereby transmitter 138 may transmit signal 122 via local channel 124 to receiver 142.

Receiver 142 may include a device configured to receive a message, packet, pulse and/or other signal (e.g., 122) via local channel 124. For example, receiver 142 may include an intended receiver to which signal 122 is transmit by transmitter 140 via local channel 124. According to an example embodiment, in addition to receiving signal 122, receiver 142 may also receive energy emissions (e.g. crosstalk) produced as the result of other adjacent transmissions.

As discussed above, local channel 126 may emit crosstalk 126 and the effect of crosstalk 126 on adjacent channels (e.g., 124A, 124B) or nodes (e.g., 142A, 142B) may be minimized or increased as the location of the receiving channels or nodes in relation to local channel 124 is increased or reduced. For example, the further an adjacent channel is from local channel 124, the less likely it is to receive crosstalk 126 and/or the less strength crosstalk 126 will have if received by the adjacent channel. However, similar to how signal 122 may attenuate during transmission via local channel 124, so too may crosstalk 126 attenuate across local channel 124. For example, crosstalk 126 may be greater or more powerful the closer an adjacent channel or receiving node is to transmitter 140 and weaker near receiver 142 (i.e., the far length of local channel 124).

Receive filter 144 and decision block 146 may process signal 122 as received via local channel 124 by receiver 142. Receive filter 144 may include a filter configured to adjust and or compensate, at least in part, for the attenuation undergone by received signal 122 during transmission via local channel 124. For example, signal 122 may have been transmitted with main pulse 118 amplitude of 5 volts and duration of 1 time unit, however signal 122 may have been received with main pulse 118 amplitude of 3 volts and a duration of 2 time units. Then for example, receive filter 144 may adjust main pulse 118, as received after attenuation, to more closely resemble main pulse 118 at transmission time. The receipt of adjacent crosstalk, for example, may make it more difficult for receive filter 144 to determine not only what the received signal and/or pulse looked like at transmission time but also which signal(s) were intended to be received versus which signals or noise was received as a result of crosstalk 126.

Then decision block 146 may determine from signal 122, as adjusted by receive filter 144, what each pulse (e.g. main pulse 118) signifies. For example, datasource 136 may have provided to transmitter 140 a bit stream of 1s and −1s, then for example, decision block 146 may determine whether main pulse 118 of received signal 122 correlates to 1 or −1. According to an example embodiment, decision block 146 may determine, or at least attempt to determine, the bit stream as provided by datasource 136 to transmitter 140 from signal 122 as received by receiver 142.

As discussed above, receiver 142 may include an intended receiver for signal 122 as transmit from transmitter 140 via local channel 124. However, system 100 may include one or more other adjacent receivers 142A and 142B, to which signal 122 was not intended to be received, but which may receive crosstalk 126 from the transmission of signal 122. Receivers 142A and 142B may include receivers similar or substantially similar to receiver 142 configured to receive signals via other channels 124A and 124B from other transmitters 140A and 140B, respectively. Channels 124A and 124B and transmitters 140A and 140B may be similar or substantially similar to local channel 124 and transmitter 140, respectively. According to an example embodiment channels 124A and 124B may emit crosstalk (e.g. 126) of their own that may be received by receiver 142.

While both receivers 142A and 142B may receive crosstalk 126 from local channel 124, they may vary in how much crosstalk 126 is received and the impact which the received crosstalk 126 has on signal processing. For example, a closer proximity between a receiver (e.g. 142A, 142B) and local channel 124 and/or transmitter 140 may result in a greater volume of crosstalk 126 being received. For example, in the system 100, receiver 142B may receive more crosstalk 126 than receiver 142A because receiver 142B is located closer to local channel 124 from which crosstalk 126 is emitted.

Also, as discussed above, the longer a channel (e.g. 124, 124A, 124B) is, i.e. as the distance between a transmitter (e.g. 140, 140A, 140B) and an intended receiver (e.g. 142, 142A, 142B) increases, the more attenuated a signal (e.g. 122) may become when transmitted via the channel. For example, a signal transmitted from transmitter 140B to receiver 142B via channel 124B may become more attenuated than a signal transmitted form transmitter 140A to receiver 142A via channel 124A because channel 124B is longer than channel 124A. Then for example, the more attenuated a signal becomes, the more likely it is to be corrupted by crosstalk 126 when received at a receiver.

Thus two factors that may determine how much impact crosstalk (e.g. 126) has on signal processing are the length of a channel and the proximity of a receiver or receiving node or channel to an emitting channel and/or transmitter. For example, receiver 142B is more likely to be affected by crosstalk 126 than receiver 142A because receiver 142B is not only in closer proximity to local channel 124 but also channel 124B is a longer channel and attenuates a transmitted signal more than channel 124A. Then for example, in the system 100, receiver 142B may be the basis from which threshold 128 may be determined, as receiver 142B may be more affected by crosstalk 126. In other example embodiments, multiple and/or different receivers (e.g. 142, 142A, 142B) may be used to determine threshold 128.

As discussed above, transmit equalizer 102 equalizes to account for attenuation during transmission of a signal (e.g. 122) via a channel (e.g. 124). However, in certain cases, the attenuation may be so minor, for example with a short channel, that equalization may not be necessary to compensate for the attenuation. In those cases however, even though equalization may not be necessary to compensate for the attenuation, equalization may still be necessary to ensure the constraints of max main tap amp 130 and/or max amp range 132 are met.

For example, a bit stream received from datasource 136 may include one or more bits that may correspond to a main pulse (e.g. 118) of amplitude 7 volts, however max main tap amp 130 may be set to 6 volts. Then for example, transmit equalizer 102 may determine ratio 134 whereby main tap 104 amplitude is set to 6 volts or less. Reducing the amplitude of main tap 104 may cause at least a partially corresponding increase in the amplitude of precursor tap 108 and/or postcursor tap 110 to account, at least in part, for the reduced voltage from the amplitude of main tap 104.

At higher transmission speeds, practical constraints in implementation technology may limit the amount of high frequency energy line driver 128 may produce and therefore may also reduce high frequency crosstalk generation. Typical crosstalk mechanisms like inductive and capacitive coupling, for example, may limit the amount of low frequency crosstalk. So, in high speed systems crosstalk 126 may be dominated by mid frequency energy, as an example. Constraining or limiting the main tap of transmit equalizer 102 (e.g., with max main tap amp 130) may directly control or limit the amount of mid frequency energy generated by transmitter 140 and thereby approximately constrain or limit crosstalk 126, as an example embodiment.

System 100 may allow for the reduction and/or limitation of crosstalk emitted by one or more channels by constraining the amplitude of a main pulse (e.g. 118) of signals (e.g. 122) transmitted via the channels. In constraining the amplitude of the main pulse, system 100 may allow multiple channels and/or signals to be individually equalized without concern that equalizing a first channel will generate crosstalk (e.g. 126) such to interfere with the signal processing and/or transmission of adjacent channels or receivers.

Figure 2A:
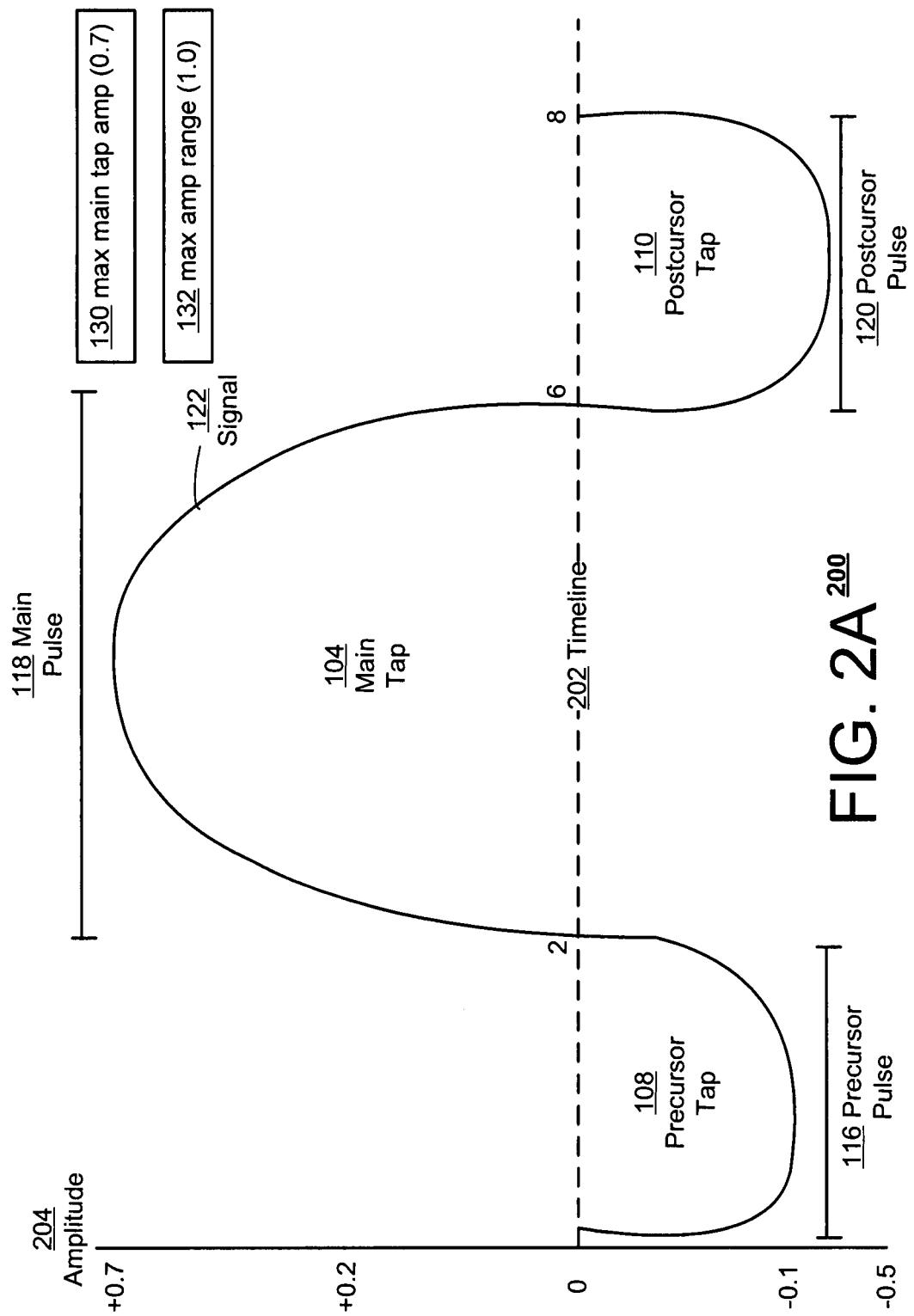
FIG. 2A illustrates a graph of a signal that may be generated by the system of FIG. 1 according to an example embodiment.

FIG. 2A illustrates a graph (200) of a signal (e.g. 122) that may be generated by the system 100 of FIG. 1 according to an example embodiment. Further details of system 100 may be explained with reference to FIG. 2A. In this example, in response to receiving a positive amplitude signal or bit (as an example received signal), transmit equalizer 102 may generate three pulses (116, 118 and 120), which may be generated by the three taps (e.g., 104, 108, 110) of the FIR filter or transmit equalizer 102.

Signal 122 may include, for example, a filtered signal after equalization by transmit equalizer 102 (and after application of voltage by line driver (e.g., 138)). Signal 122 may include main pulse 118, precursor pulse 116 and postcursor pulse 120, which may correspond to main tap 104, precursor tap 108 and postcursor tap 110, respectively. Each pulse (e.g. 118, 116, 120) may last for a duration or period of time as determined by or measured on a timeline 202.

Timeline 202 may include a measure of the time unit duration of signal 122. For example, signal 122 may span 8 time units. Precursor pulse 116 may include a duration of 2 time units, main pulse 118 may include a duration of 4 time units and postcursor pulse 120 may include a duration of 2 time units. In other example embodiments, the pulses may have different durations whereby precursor pulse 108, for example, may have a duration that varies from postcursor pulse 120.

Each tap (e.g. 104, 108, 110) may include an amplitude as measured on amplitude 204 (which may correspond to the amplitude of the related pulses 118, 116 and 120, respectively). Amplitude 204 may include a measure of the amplitude and/or strength of signal 122, or portions thereof. For example, main tap 104 may have an amplitude of +0.7, precursor tap may have an amplitude of −0.1 and postcursor tap 110 may have an amplitude of −0.2. Amplitude 204 may, for example, be measured in volts or millivolts.

According to the example of graph 200, max amp (amplitude) range 132 may be set to a value of 1 and max main tap amp (amplitude) 130 may be set to a value of 0.7. Then for example, as discussed above, a FIR filter or transmit equalizer (e.g. 102) may adjust an incoming data stream based on max amp range 132 and max main tap amp 130. For example, main tap 104 may be set to an amplitude of +0.7 during equalization, thus staying within the max main tap amp 130 value of 0.7.

Also as a result of equalization, the absolute sum of the amplitudes of the taps of signal 122 may be kept at or below the max amp range 132 of 1. For example, the absolute sum of the amplitudes of precursor tap 108, main tap 104 and postcursor tap 110 may be less than or equal to 1. As discussed above main tap 104 may have amplitude +0.7, which may allow up to an additional 0.3 to be distributed among the secondary taps (e.g. 108 and 110), which may have amplitudes of −0.1 and −0.2, respectively. Thus, the absolute sum of the amplitudes of the taps (e.g. 104, 108, 110) of signal 122 is less than or equal to max amp range 132. In other example embodiments, the absolute sum of the amplitudes of the taps may be less than max amp range 132.

Although in FIG. 2A, signal 122 may appear sinusoidal in shape, in other example embodiments signal 122 may include signals of varying appearance, including but not limited to sinusoidal.

Figure 2B:
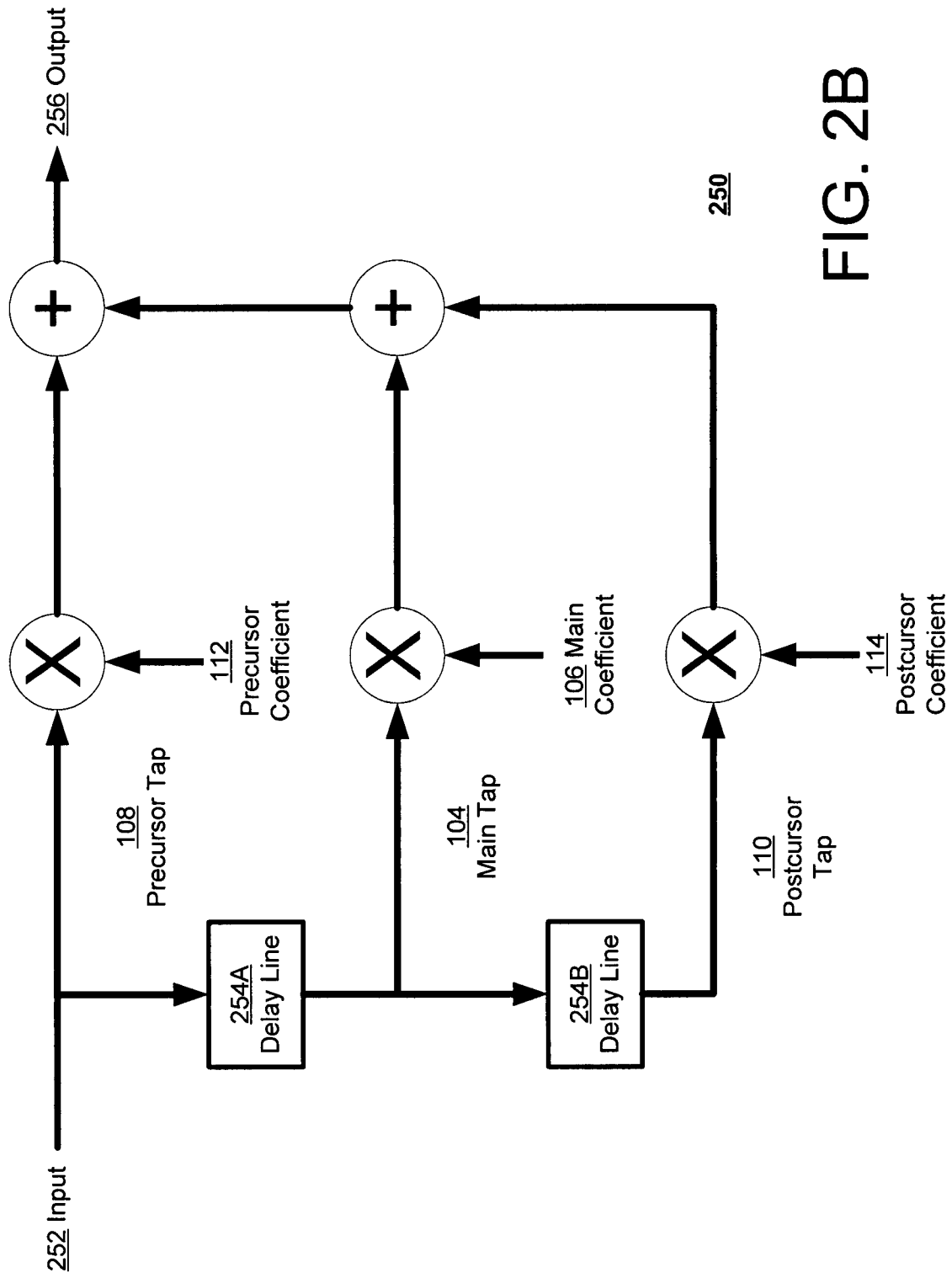
FIG. 2B is a block diagram of an example finite impulse response (FIR) filter.

FIG. 2B is a block diagram of an example finite impulse response (FIR) filter 250. As discussed above, the FIR filter 250 may be used for example, for managing crosstalk emissions. According to an example embodiment, a transmit equalizer (e.g. 102) may include FIR filter 250. FIR filter 250 is an example 3 tap (e.g., 108, 104, 110) digital filter, however other example embodiments may include more or less taps.

In the example of FIG. 2B, a bit may be input (252) to the FIR filter 250. Then the bit, or at least a portion or version thereof, may be provided to precursor tap 108 for processing, as discussed above (e.g., multiplication by a precursor coefficient 112). Then for example, a delayed version of the input bit may be provided via delay line 254A to main tap 104.

Delay line 254A and 254B may include a single input channel device wherein the output is equivalent or substantially similar to the input, except that the output has been delayed by an amount of time or a specified number of time units. The input bit 252 may be input to precursor tap where the bit 252 is multiplied by a precursor coefficient. The input bit 252, delayed by delay line 254A is input to Main tap 104 where the delayed input bit is multiplied by main coefficient 106. Similarly, a twice delayed version of input bit 252 (delayed by delay lines 254A and 254B) is input to postcursor tap 110 where the delayed bit is multiplied by postcursor coefficient 114.

The bits (or signals), after being multiplied by precursor coefficient 112, main coefficient 106 and postcursor coefficient 114, are summed together and output as output 256. The output signal may, for example, be the same or similar to the signal 122 in FIG. 2A, including a precursor pulse 116, a main pulse 118 and/or a postcursor pulse 120. For example, in some instances, the signal 256 output by FIR filter 250 may be considered an adjusted or equalized version of the input bit 252, since it may include an adjusted main pulse (output from main tap 104), and/or include additional or secondary pulses output from precursor tap 108 and/or postcursor tap 110 (as examples). The secondary pulses (116, 120) may, for example, make it easier at the receiver to detect the received bit by emphasizing the rising and falling edges of the bit.

Figure 3:
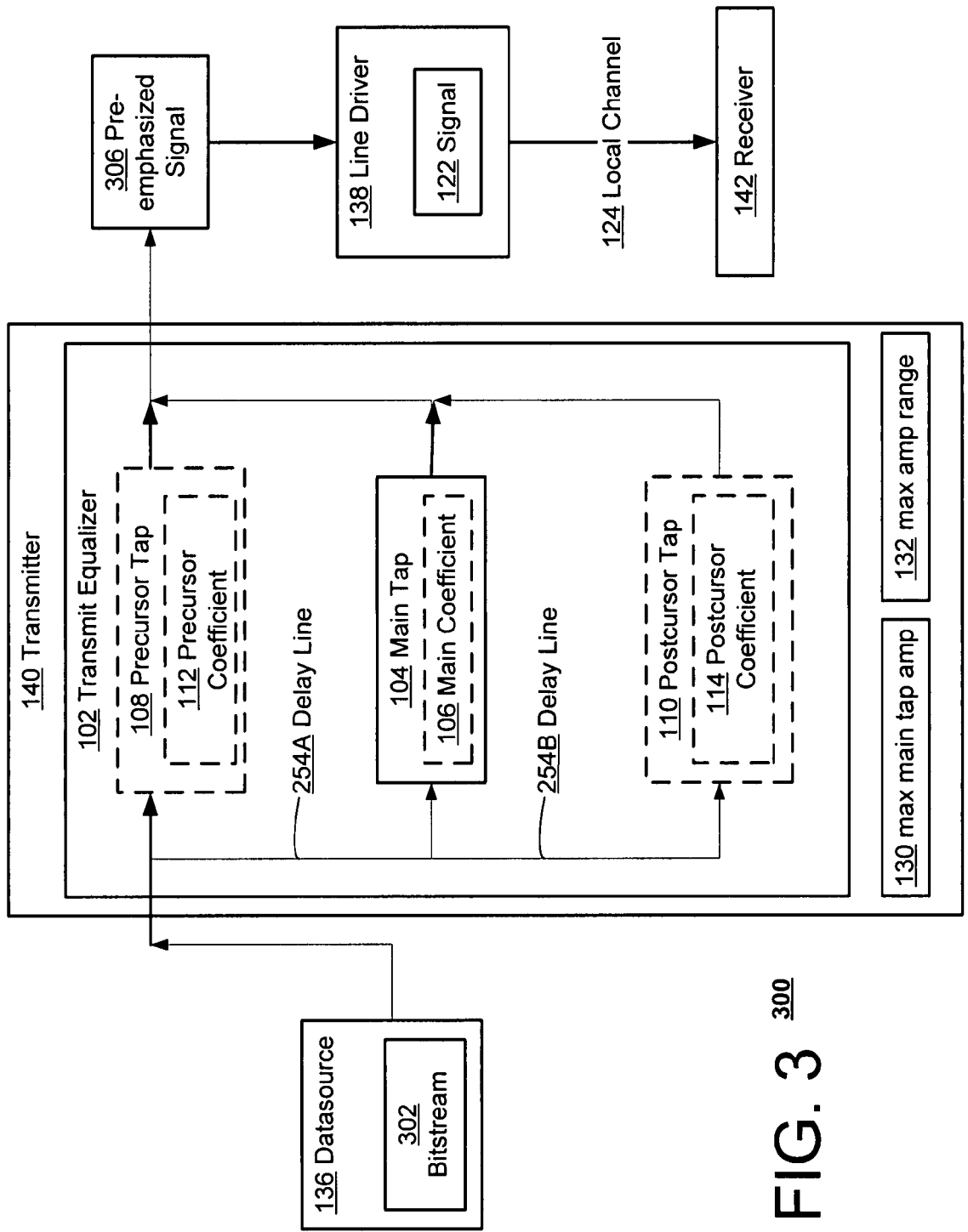
FIG. 3 is a block diagram illustrating an example flow associated with managing crosstalk emissions, according to an example embodiment.

FIG. 3 is a block diagram illustrating an example flow associated with managing crosstalk emissions, according to an example embodiment. In the example of FIG. 3 it may be understood that numerals on the example system 300 may be similar or substantially similar to like-numbered numerals or items of FIG. 1, FIG. 2A and/or FIG. 2B.

Datasource 136 may provide bit stream 302 to transmitter 140. Bit stream 302 may include a sequence of one or more bits corresponding to data, signals or other information to be transmit to receiver 142. For example, bit stream 302 may include a sequence of bits, e.g., ones (1s) and zeros (0s), which may be represented by signals that are either +1 or −1, for example.

Transmitter 140 may then provide bit stream 302 to transmit equalizer 102. Transmit equalizer 102 may adjust and/or equalize bit stream 302 based on max main tap amp 130 and max amp range 132, as discussed above. Transmit equalizer 102 may include one or more delay lines 254A and 254B.

Bit stream 302 may enter or otherwise be provided to precursor tap 108 without any delay, for example. Then for example bit stream 302, or at least a portion thereof, may follow delay line 254A to main tap 104, whereby main tap 104 may receive bit stream 302 (or a portion thereof) a specified number of time units after precursor tap 108. Then for example bit stream 302, or at least a portion thereof, may follow a second delay line 254B to postcursor tap 120 wherein postcursor tap 120 may receive bit stream 302 (or a portion thereof) a specified number of time units after main tap 104.

Each tap may then, as discussed above, adjust and/or equalize bit stream 302, e.g., within the constraints of max main tap amp 130 and max amp range 132, whereby the equalization may include determining a ratio (e.g., 134) for the amplitudes and/or coefficients (e.g., 112, 106, 114) of each tap. For example, precursor tap 108 may multiply bit stream 302 by precursor coefficient 112, whereby main tap 104 and postcursor tap 120 may multiply bit stream 302 by main coefficient 106 and postcursor coefficient 114, respectively.

Then for example, the resultant or adjusted bit(s) from the taps may be united or otherwise adjoined in delay order. For example the precursor tap 108 adjusted bit(s) may be followed by the delayed and adjusted main tap 104 bit(s) which may be followed by the twice delayed and adjusted postcursor tap 110 bit(s), resulting in an pre-emphasized signal 306. Pre-emphasized signal 306 may include an equalized bit stream, such as bit stream 302 after having undergone equalization by transmit equalizer 102. For example, as discussed above bit stream 302 may include a whole number bit stream such as 1s and −1s, then pre-emphasized signal 306 may include a real number or floating point bit stream. For example, bit stream 302 may include 1 −1 1 1 −1 1 whereby pre-emphasized signal 306 may include −0.55 −0.3 0.98 1 −0.24 −0.01. In other example embodiments pre-emphasized signal 306 may include more or less numbers than included in bit stream 302. For example, the bit versions as adjusted by precursor tap 108 and postcursor tap 110 may each add additional bit(s).

Pre-emphasized signal 306 may be provided to line driver 138 which may provide voltage to pre-emphasized signal 306 to result in signal 122. Signal 122 may then be provided via local channel 124, where it may become attenuated during transmission, to receiver 142, which may filter and try to determine from signal 122, bit stream 302 (e.g., whether each pulse of signal 122 corresponds to a 1 or −1).

Figure 4:
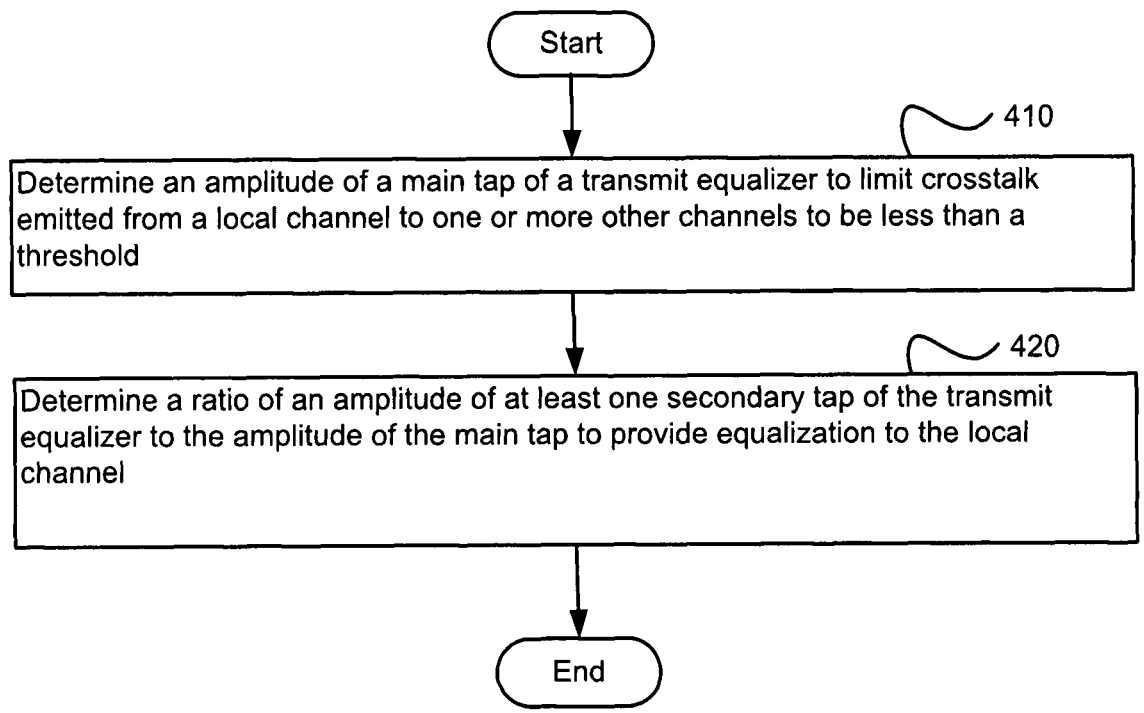
FIG. 4 is a flow chart illustrating managing crosstalk emissions according to an example embodiment.

FIG. 4 is a flow chart illustrating managing crosstalk emissions according to an example embodiment.

At 410, an amplitude of a main tap of a transmit equalizer may be determined to limit crosstalk emitted from a local channel to one or more other channels to be less than a threshold. For example, in FIG. 1, max main tap amp (amplitude) 130 may be determined to limit crosstalk 126 as emitted from local channel 124 to channels 124A and 124B to be less than threshold 128. Then for example, during equalization, transmit equalizer 102 may use max main tap amp 130 as a maximum or set value for the amplitude of main tap 104.

At 420, a ratio of an amplitude of at least one secondary tap of the transmit equalizer to the amplitude of the main tap to provide equalization to the local channel. For example, transmit equalizer 102 may determine ratio 134 to equalize an incoming bit stream from datasource 136. In determining ratio 134, transmit equalizer 102 may determine ratios of the amplitudes of precursor tap 108, main tap 104 and postcursor tap 110.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
setting an amplitude of a main tap of a transmit equalizer to limit crosstalk emitted from a local channel to one or more other channels to be less than a threshold;
determining a ratio of an amplitude of at least one secondary tap of the transmit equalizer to the amplitude of the main tap to provide equalization to the local channel; and
setting the amplitude of the at least one secondary tap of the transmit equalizer to provide the determined ratio, wherein a sum of absolute values of the amplitudes of the main tap and the at least one secondary tap is less than or equal to a maximum amplitude range.

2. The method of claim 1 wherein the setting an amplitude of a main tap comprises setting the amplitude of a main tap or pulse output from a FIR (Finite Impulse Response) transmit filter to set or limit the crosstalk emitted from the local channel to one or more of the other channels to be less than the threshold or to set the crosstalk emitted from the local channel to a fixed value.

3. The method of claim 1 wherein the setting an amplitude comprises setting the amplitude of the main tap to be less than or equal to a maximum main tap amplitude, the maximum main tap amplitude configured to limit crosstalk emitted from the local channel to be less than the threshold.

4. The method of claim 1 wherein the determining a ratio comprises determining the ratio of an amplitude of a precursor tap of the transmit equalizer to the amplitude of the main tap to provide the equalization to the local channel.

5. The method of claim 1 wherein the determining a ratio comprises determining the ratio of an amplitude of a postcursor tap of the transmit equalizer to the amplitude of the main tap to provide the equalization to the local channel.

6. The method of claim 1 and further comprising determining an amplitude of the at least one secondary tap based on the set amplitude of the main tap and the determined ratio.

7. The method of claim 1 wherein the determining a ratio comprises determining the ratio of a secondary coefficient associated with each of the at least one secondary taps to a main coefficient associated with the main tap, wherein a sum of absolute values of the main coefficient and the at least one secondary coefficient is less than or equal to a maximum amplitude range.

8. An apparatus comprising:
a transmit equalizer having a main tap associated with a main pulse output from the equalizer and at least one secondary tap associated with at least one secondary pulse output from the equalizer;
wherein:
an amplitude of the main tap of the transmit equalizer is configured to limit crosstalk emitted from a local channel to one or more other channels to be a fixed value or to be less than a threshold;
a ratio of an amplitude of the at least one secondary tap of the transmit equalizer to the amplitude of the main tap is configured to provide equalization to the local channel; and
wherein a sum of absolute values of the amplitudes of the main tap and the at least one secondary tap is less than or equal to a maximum amplitude range.

9. The apparatus of claim 8 wherein the transmit equalizer comprises a FIR (Finite Impulse Response) filter.

10. The apparatus of claim 8 wherein a coefficient is associated with each of the main tap and the least one secondary taps, and wherein a ratio of the coefficients as determined by the transmit filter are configured to provide the equalization to the local channel.

11. The apparatus of claim 8 wherein the at least one secondary tap comprises a precursor tap associated with a precursor pulse output by the transmit equalizer, wherein the ratio of an amplitude of the precursor tap of the transmit equalizer to the amplitude of the main tap is configured to provide the equalization to the local channel.

12. The apparatus of claim 8 wherein the at least one secondary tap comprises a postcursor tap associated with a postcursor pulse output by the transmit equalizer, wherein the ratio of an amplitude of the postcursor tap of the transmit equalizer to the amplitude of the main tap is configured to provide the equalization to the local channel.

13. The apparatus of claim 8 wherein the apparatus further comprises the local channel coupled to the transmit equalizer.

14. The apparatus of claim 8 wherein the apparatus further comprises a line driver coupled to the transmit equalizer to drive signals output from the transmit equalizer onto the local channel.

15. The apparatus of claim 8 wherein the apparatus comprises:
a transceiver, the transceiver comprising a PHY (physical layer interface), the PHY including:
a transmitter including the transmit equalizer and a line driver coupled to the transmit equalizer; and
a receiver including a receive filter and a decision block coupled to the receive filter.

16. A system comprising:
a transmitter including a transmit equalizer configured to:
determine a ratio of a main tap to one or more secondary taps to provide equalization to a local channel, the main tap and the one or more secondary taps each of which being associated with a pulse of a signal output by the transmitter;
wherein an amplitude of a main pulse associated with the main tap is less than or equal to a maximum main tap amplitude configured to limit crosstalk emitted from the local channel to one or more other channels to be less than a threshold; and
wherein a sum of absolute values of amplitudes of the main tap and the at least one secondary tap is less than or equal to a maximum amplitude range; and
a receiver configured to receive the signal output by the transmitter via the local channel.

17. The system of claim 16 wherein one or more other receivers receive at least a portion of the crosstalk emitted from the local channel.

18. The system of claim 16 wherein the main tap and each of the one or more secondary taps include a coefficient by which to adjust an incoming data stream such that a ratio of a main pulse of the adjusted data stream to one or more secondary pulses of the data stream provide equalization to a local channel and wherein an amplitude of the main pulse of the adjusted data stream is less than or equal to the maximum main tap amplitude.

* * * * *